United States Patent [19]
Calton et al.

[11] Patent Number: 5,579,647
[45] Date of Patent: Dec. 3, 1996

[54] DESICCANT ASSISTED DEHUMIDIFICATION AND COOLING SYSTEM

[75] Inventors: Dean S. Calton, Lavernia, Tex.; James A. Coellner, Philadelphia, Pa.

[73] Assignee: Engelhard/ICC, Philadelphia, Pa.

[21] Appl. No.: 472,612

[22] Filed: Jun. 7, 1995

Related U.S. Application Data

[63] Continuation-in-part of Ser. No. 2,427, Jan. 8, 1993, Pat. No. 5,448,895.

[51] Int. Cl.$^6$ ............................. F25D 17/06; F25D 23/00
[52] U.S. Cl. .................... 62/94; 62/223; 62/271
[58] Field of Search ..................... 62/90, 94, 271, 62/223

[56] References Cited

U.S. PATENT DOCUMENTS

| | | | |
|---|---|---|---|
| 2,499,901 | 3/1950 | Brown, Jr. | 257/239 |
| 2,926,502 | 3/1960 | Munters et al. | 62/94 |
| 2,968,165 | 1/1961 | Norback | 62/94 |
| 3,598,179 | 8/1971 | Giauque | 165/111 |
| 3,835,920 | 9/1974 | Mondt | 165/81 |
| 3,871,852 | 3/1975 | Pei | 65/4 |
| 4,002,198 | 1/1977 | Wagner et al. | 165/61 |
| 4,093,435 | 6/1978 | Marron et al. | 55/269 |
| 4,134,743 | 1/1979 | Macriss et al. | 55/34 |
| 4,228,847 | 10/1980 | Lindahl | 165/10 |
| 4,236,577 | 12/1980 | Neudeck | 165/175 |
| 4,255,171 | 3/1981 | Dravnieks | 55/269 |
| 4,474,021 | 10/1984 | Harband | 62/271 X |
| 4,535,838 | 8/1985 | Gray et al. | 165/134 R |
| 4,594,860 | 6/1986 | Coellner et al. | 62/271 |
| 4,887,438 | 12/1989 | Meckler | 62/271 |
| 4,905,479 | 3/1990 | Wilkinson | 62/271 |
| 4,942,740 | 7/1990 | Shaw et al. | 62/223 |
| 5,137,080 | 8/1992 | Haasch et al. | 165/78 |
| 5,148,374 | 9/1992 | Coellner | 364/505 |
| 5,170,633 | 12/1992 | Kaplan | 62/94 |
| 5,176,005 | 1/1993 | Kaplan | 62/94 |
| 5,265,673 | 11/1993 | Hucsko | 165/176 |
| 5,318,109 | 6/1994 | Yamada et al. | 165/135 |
| 5,448,895 | 12/1995 | Calton et al. | 62/271 |

OTHER PUBLICATIONS

Kays, W. M., et al., "Heat Transfer and Flow–Friction Design Data", *Compact Heat Exchangers*, 3d Ed., Chapter 10, pp. 186–188, 279.

*Primary Examiner*—William E. Wayner
*Attorney, Agent, or Firm*—Panitch Schwarze Jacobs & Nadel, P.C.

[57] ABSTRACT

A desiccant assisted system for dehumidification and cooling of an enclosed space comprising a rotatable desiccant wheel and a rotatable heat exchange wheel. A first path for process air extends from an exit of the enclosed space to be conditioned in series through a first zone of the rotatable desiccant wheel, a first zone of the rotatable heat exchange wheel and an entrance to the enclosed space. A second path for regenerative air extends from an entrance to ambient air outside the enclosed space in series through a second zone of the rotatable heat exchange wheel, a second zone of the rotatable desiccant wheel and an exit back to ambient air outside the enclosed space. Condenser coil(s) are provided along the second, regeneration air path between the rotatable wheels. A compressor is provided and a first process evaporator is coupled with the compressor and located along the first path. A second process evaporator located in series along the first path between the first process evaporator and the entrance to the enclosed space. A condenser is coupled with the compressor and located along the second path between the rotatable wheels. A recovery evaporator is also coupled with the compressor and located in series along the second path.

16 Claims, 4 Drawing Sheets

DESICCANT ASSISTED DEHUMIDIFICATION AND COOLING SYSTEM

This application is a continuation-in-part of U.S. application Ser. No. 08/002,427 filed Jan. 8, 1993 now U.S. Pat. No. 5,448,895.

FIELD OF THE INVENTION

The invention relates to desiccant space conditioning systems. More particularly, the present invention provides a hybrid desiccant air cooling and dehumidification system.

BACKGROUND OF THE INVENTION

Dehumidification in warm weather has typically been provided by conventional air conditioning systems and heat pumps operating in a cooling mode. Those systems are controlled primarily by a thermostat sensing room or space temperature. For cooling operation, the air conditioner or the heat pump is generally cycled on and off by the thermostat. Space humidity is controlled indirectly by cooling the air below its saturation dew point to condense moisture out of the cooled air. When cooling was not called for, the space humidity load was not addressed by such systems.

For special applications where humidity control was important, a separate humidistat would be provided to force the air conditioner or heat pump to operate and cool even though the thermostat was not calling for cooling. When this happened, the space would be overcooled. Where a heat pump with supplemental heating was provided, the supplemental heating could be forced on during cooling to reheat the air. However, because of the inherent inefficiencies of overcooling and then reheating, it has generally been too costly both in terms of dollars and natural resources to provide such systems for use in residential or like commercial applications.

Regenerative type periodic flow devices are conventionally employed for the transfer of heat and moisture from one fluid stream to another, and thereby from one area or zone in space to another. Typically, a sorptive mass is used to collect heat or moisture from one fluid stream which flows over or through the sorptive mass. The flowing fluid is rendered either cooler (in the case of heat sorption) or less humid (in the case of adsorption of moisture). The sorptive mass is then taken "off-stream" and regenerated by exposure to a second fluid stream which is capable of accepting the heat or moisture desorbed with favorable energetics.

In many instances, the sorptive material is contained within a vessel or distributed within a bed structure. It is desirable that such material be provided with maximum surface area, and that the fluid flow through the sorptive material matrix in a smooth (non-turbulent) and regular state. Once the sorptive material has been saturated (i.e., has reached its maximum designed capacity for sorption), the vessel or bed is then removed from the fluid flow path and exposed to a second fluid flow to regenerate the sorptive capacity of the material by, for instance, cooling the sorptive material or desorbing material taken up during "on-stream" operation. After such regeneration, the sorptive material is once more placed back "on-stream" and the operation continues.

From such single cycle systems evolved multiple vessel systems which permitted semi-continuous (or semi-batch) operation by synchronously alternating two or more sorptive vessels between on-stream and off-stream operation. The choice of numbers of vessels and cycle structures depends on many factors, but most importantly the ratio between consumption rate of the sorptive capacity of the vessel, and regeneration rates for that same vessel.

In some applications, semi-continuous systems have evolved into continuous flow systems where the sorptive media itself is moved between two or more flowing fluid streams. The most common construction employed for such systems is a porous disk, often referred to as a wheel or rotor. In its simplest form, such a wheel is divided into two flow zones, and fluid is passed over the sorptive surface of the wheel (typically flowing through the thickness of the disc parallel to the rotational axis of the cylinder) as the wheel is rotated to carry the sorptive material from one zone, into the other, and back again to complete a revolution. In a heat exchanger wheel, for instance, one zone of warm fluid and one zone of cooler fluid are present. Heat is adsorbed by the material of the wheel in the warm flow zone, and is carried away from the wheel as the sorptive material passes through the cool flow zone. U.S. Pat. No. 4,594,860 discloses such a continuous flow system and is hereby incorporated by reference.

Generally, a moisture transfer wheel assembly is provided which is separated into two sections to provide an intake path and an exhaust path through the moisture transfer wheel. A heat exchanger wheel assembly, also partitioned to provide intake and exhaust paths, is located substantially adjacent to the moisture transfer wheel, separated only by a heat regeneration coil. An auxiliary heating coil may be placed in the system for use in cold months when it is desirable to heat the interior of the area to be conditioned, rather than to cool it. The heat regeneration coil and heating coil include fluid pipes which are interconnected with standard heating units, such as a solar heating unit. The system terminates in a pair of evaporator pads.

Heat regeneration coils and heating coils are generally of conventional structure. That is, in conventional coil arrangements, the tubing is mechanically connected to fin sheets. The fin sheets are used to extend the surface area of the tubes to increase the coil's heat-transfer effectiveness. That is, a typical condenser or cooling coil is made up of finned tube sheets with good transfer conduction material, typically aluminum or copper, with holes punched in a pattern array through which the tubes are inserted. Through various means, the tubes are expanded to make good contact with the finned tube sheets. In a typical application, air passes over the tubes and fins and is either cooled or heated by the fluid flowing inside the tubes.

Since heat is conducted not only to the area that passes over the fin sheets, but from the warmest area on the finned surface to the coolest area on the finned surface, because of the high conduction of fin sheets, the fin sheets tend to average out the temperature across the coil, even though the fluid in the tube is at different temperatures between front and back. Thus, the upper and lower temperature limits to which the air can be heated or cooled is therefore limited, which directly affects the total heat transferred by the coil and the energy efficiency of the system. Thus, a need has arisen for a condensing or cooling coil which can minimize the effect of averaging out the temperature across the coil without losing the benefit of the use of fin sheets.

In one known system, generally referred to as a "recirculation" system, process air is drawn from within an enclosed and conditioned space, processed by dehumidification and/or cooling, and then returned to the enclosed space. As is well known, moisture is removed from the process air by the moisture transfer wheel. When moisture is removed from the process air, the temperature of the process air increases. The process air is subsequently cooled upon passing through heat exchanger wheel, which lowers the temperature of the warm, dry air.

In some of the known systems, evaporator pads are used to add moisture to the process air, thus reducing the temperature further and supplying cool air to the conditioned area. In other known systems, an evaporator coil of a conventional air conditioning system is used to cool the dehumidified process air. However, the amount of cooling of the dehumidified process air could not be accurately controlled, because the amount of cooling was based on the evaporator size and the compressor load, often resulting in over-cooling or under-cooling of the dehumidified air.

The foregoing problem of not being able to control the return temperature of the dehumidified process air has not been previously addressed, and generally, the process air is over-cooled before it is returned to the enclosed space, resulting in a less efficient system.

The present invention solves the foregoing problem by providing several controllable stages of dehumidification and cooling through the use of two process evaporators and a recovery evaporator such that the return temperature of the dehumidified process air can be accurately and efficiently controlled.

SUMMARY OF THE INVENTION

In one aspect the invention is a desiccant assisted system for dehumidification and cooling of an enclosed space comprising a rotatable desiccant wheel and a rotatable heat exchange wheel. A first path for process air extends from an exit of the enclosed space to be conditioned in series through a first zone of the rotatable desiccant wheel, a first zone of the rotatable heat exchange wheel and an entrance to the enclosed space. A second path for regenerative air, separate from the first path, extends from an entrance to ambient air outside the enclosed space in series through a second zone of the rotatable heat exchange wheel, a second zone of the rotatable desiccant wheel and an exit back to ambient air outside the enclosed space. A compressor is provided and a first process evaporator is coupled with the compressor and located along the first path between the rotatable heat exchange wheel and the entrance to the enclosed space. A second process evaporator is located along the first path between the heat exchange wheel and the entrance to the enclosed space proximate the first process evaporator. A condenser coil is provided along the second, regeneration air path between the rotatable wheels. The condenser is coupled with the compressor and located along the second path between the rotatable wheels. A recovery evaporator is also coupled with the compressor and located along the second path between the rotatable desiccant wheel and the exit to ambient air.

In another aspect, the present invention provides an improvement in a desiccant assisted space conditioning system including rotatable desiccant and heat exchange wheels, separate process and regenerative air paths through each of the rotatable wheels, a condenser along the regenerative air path between the two wheels, and a recovery evaporator along the regenerative air side on a side of the desiccant wheel facing away from the condenser, the improvement comprising: a process evaporator along the process air path on a side of the heat exchange wheel facing away from the condenser; and means for modulating a non-zero rate of refrigerant flow through at least one of the condensers, the recovery evaporator and the process evaporator for controllably varying the cooling of dehumidified air exiting the process air path.

In another aspect, the invention provides a method of operating a desiccant assisted dehumidification and cooling system comprising the steps of: (a) activating the desiccant assisted dehumidification and cooling system when the level of moisture of air in an enclosed space is above a desired level; (b) drawing process air from the enclosed space into the system; (c) passing process air through a first zone of a moisture transfer wheel to reduce the moisture level of the air passing therethrough; (d) passing the process air leaving the first zone of the moisture transfer wheel through a first zone of a heat transfer wheel to lower the dry bulb temperature of the process air passing therethrough; (e) passing the process air leaving the first zone of the heat transfer wheel through first and second process evaporators to further lower the dry bulb temperature of the process air passing therethrough; (f) passing regeneration air through a second zone of the heat transfer wheel to raise the dry bulb temperature of the regeneration air passing therethrough and regenerate the heat transfer wheel; (g) heating the regeneration air leaving the second zone of the heat transfer wheel to further raise the dry bulb temperature of the regeneration air leaving the second zone of the heat transfer wheel; (h) passing the heated regeneration air in step (f) through a second zone of the moisture wheel to lower the dry bulb temperature and regenerate the moisture transfer wheel; (i) passing the air leaving the second zone of the moisture wheel through a recovery evaporator; (j) compressing a refrigerant to a vapor phase at a first temperature and pressure; (k) condensing the vapor phase refrigerant with the flow of regeneration air from step (g) to create a mixed saturated liquid and vapor phase refrigerant; (l) passing the saturated liquid phase refrigerant through a flow restriction to create a mixed liquid and vapor phase refrigerant at a lower temperature and pressure than the first temperature and pressure; and (m) heating the mixed liquid and vapor phase refrigerant in at least two of the first and second process evaporators and the recovery evaporator with at least one of the process air from step (e) and the regenerative air from step (i) to create a vapor phase refrigerant to be used in step (j) which has a lower temperature and pressure than the first temperature and pressure of the compressed refrigerant of step (j).

BRIEF DESCRIPTION OF THE DRAWINGS

The foregoing summary as well as the following detailed description of the preferred embodiments will be better understood when read in conjunction with the appended drawings. For the purpose of illustrating the invention, there is shown in the drawings embodiments which are presently preferred. It should be understood, however, that the invention is not limited to the specific methods and instrumentalities disclosed. In the drawings, which are diagrammatic.

DETAILED DESCRIPTION OF THE PREFERRED EMBODIMENTS

Figure 1:
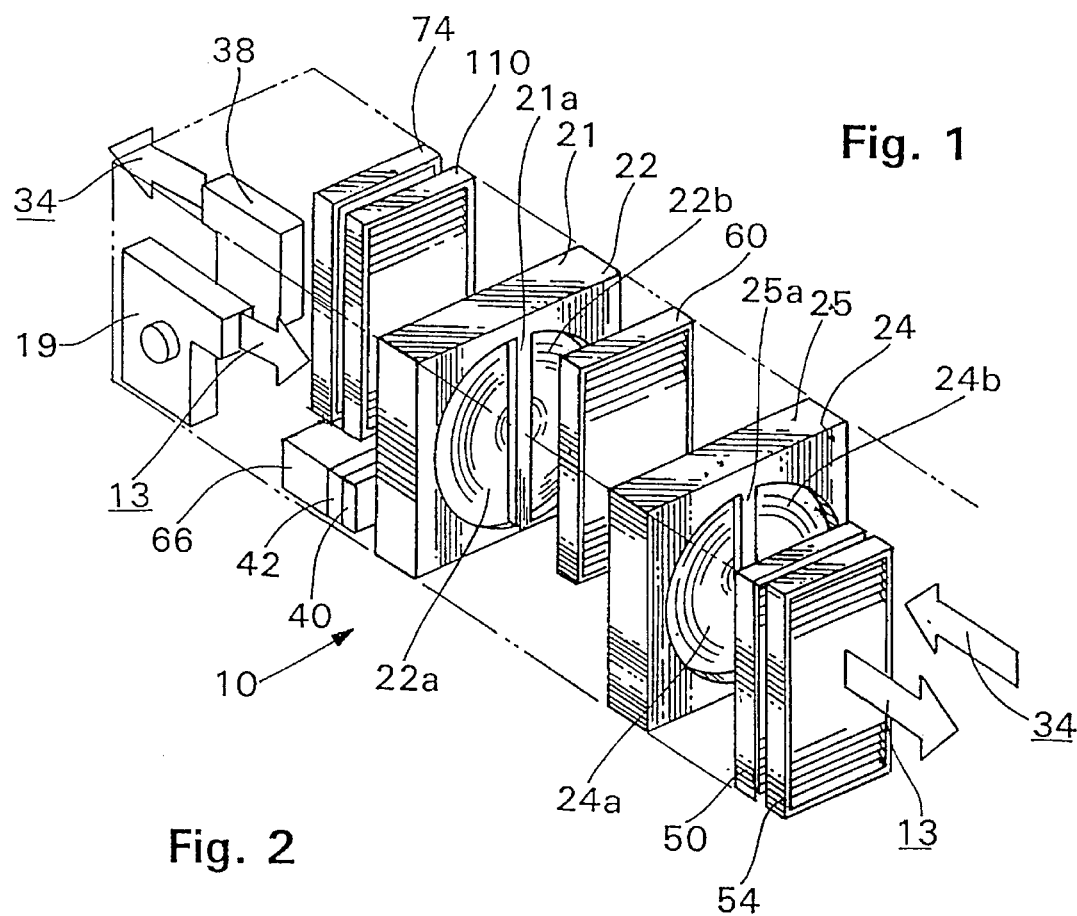
FIG. 1 is a diagrammatic perspective view of a desiccant assisted space conditioning system coupled with an enclosed space to be conditioned.

Certain terminology is used in the following description for convenience only and is not limiting. The words "right", "left", "lower" and "upper" designate directions in the drawings to which reference is made. The words "inwardly" and "outwardly" refer to directions towards and away from, respectively, the geometric center of the desiccant assisted dehumidification and cooling system or designated parts thereof. This applies to the words above specifically mentioned, derivatives thereof and words of similar import and meaning. In addition, like referenced numerals are used to indicate like elements throughout the figures.

Related U.S. Pat. No. 5,448,895 and incorporated by reference herein as if fully set forth, discloses a hybrid heat pump and desiccant space conditioning system which provides dehumidification with or without temperature change (heating or air conditioning). This system includes desiccant and thermal exchange wheels in series. The wheels are split to permit a pair of oppositely directed air flows to pass in opposing directions; a process air flow and a regeneration or recovery air flow. The former circulates air to be conditioned and passed to the interior space being conditioned. The latter permits a flow of ambient air and is used to regenerate the system. While the desiccant assisted heat pump offers economies over heat pumps without such assist, the presently disclosed systems are simpler and more efficient in warm climates where only dehumidification and cooling are desired, it would be desirable to improve upon such system as well.

Figure 2:
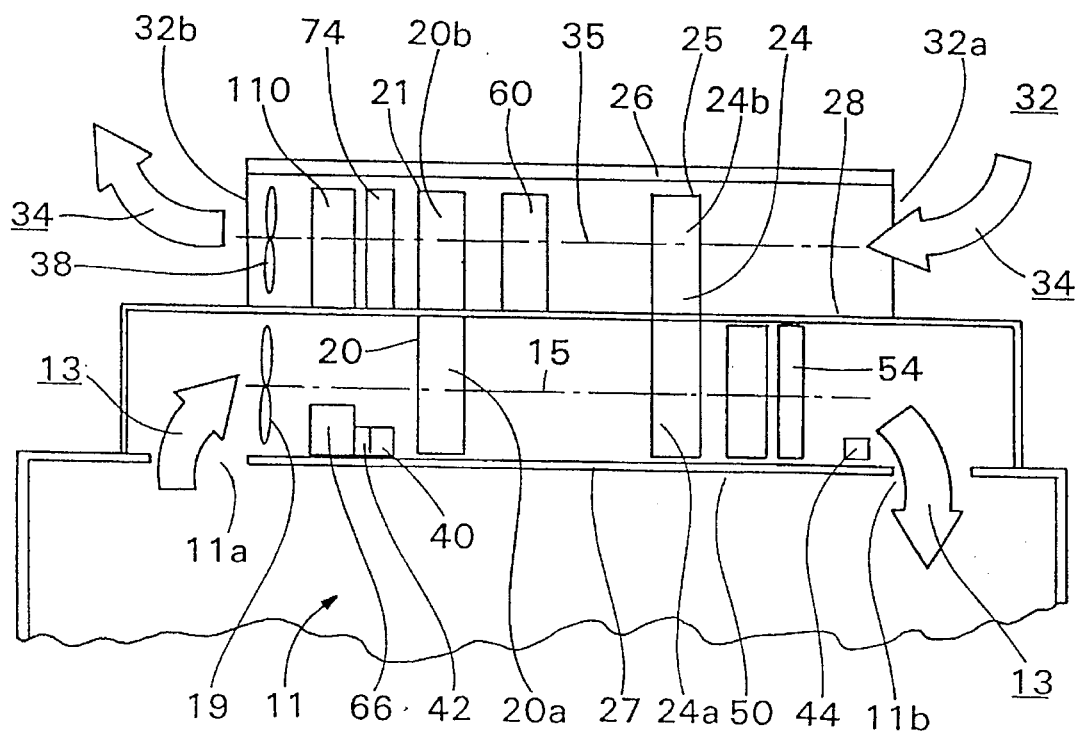
FIG. 2 is a diagrammatic top view of the system shown in FIG. 1.

Referring now to the drawings, wherein like numerals are used to indicate like elements throughout, there is shown in FIGS. 1 through 7 a first preferred embodiment of a desiccant assisted dehumidification and cooling system, according to the present invention, generally designated 10, for selectively controlling humidity and cooling of the air in an enclosed space indicated diagrammatically at 11 in FIG. 2. The dehumidification and cooling system 10 comprises a rotatable desiccant wheel 22 and a rotatable heat exchange wheel 24.

The rotatable desiccant wheel 22 constitutes the exterior or outside element of the system 10. As discussed in more detail hereinafter, the desiccant wheel 22 is separated into two sections to provide an intake path (i.e., for the process air 13) and an exhaust path (i.e., for the regenerative air 34) through the desiccant wheel 22. The heat exchange wheel 24 is also partitioned to provide intake and exhaust paths, and is located substantially adjacent to the desiccant wheel 22, separated only by the first condenser coil 60. The desiccant wheel 22 and heat exchange wheel 24 are rotatably supported within a housing (not shown), which includes two side walls 26, 27 and a central partition 28, which coincides with the partitioning of the desiccant and heat exchange wheels 22, 24.

Generally, the operation of the desiccant and heat exchange wheels 22, 24 is well known. That is, the system 10 provides removal of the moisture from process air, represented by arrows 13, by the desiccant wheel 22. When moisture is removed from the process air 13, the temperature of the process air 13 increases. The process air 13 is subsequently cooled upon passing through the heat exchange wheel 24, which lowers the temperature of the warm, dry air. Regenerative air, represented by arrows 34, flows over an evaporator pad 61 and then through the second zone 24b of the heat exchange wheel 24 to remove heat from the heat exchange wheel 24 and raise the temperature of the regenerative air 34. The evaporator pad 61 lowers the dry bulb temperature of the regenerative air 34 to the regenerative air's 34 wet bulb temperature in the range of about 65 to 80 degrees F., depending upon whether the regenerative air 34 is drawn from the building enclosed space or from atmosphere. Lowering the wet bulb temperature of the regenerative air entering the heat exchange wheel 24 assists in removing heat from the heat exchange wheel 24. The temperature of the regenerative air 34 exiting the heat exchange wheel 24 is further raised by a first condensing coil 60, as described in more detail hereinafter, to provide high temperature regenerative air 34 on the regenerative side of the system 10 just upstream from the desiccant wheel 22, resulting in regeneration of the desiccant wheel 22 as the regenerative air 34 passes therethrough. The regenerative air 34 then passes from the desiccant wheel 22 into the atmosphere.

Two elements of the system 10 which contribute to the coefficient performance (COP) of the system 10 are the desiccant wheel 22 and the heat exchange wheel 24. With the exception of the specific material used in these wheels, they may be constructed in substantially the same manner.

Figure 3:
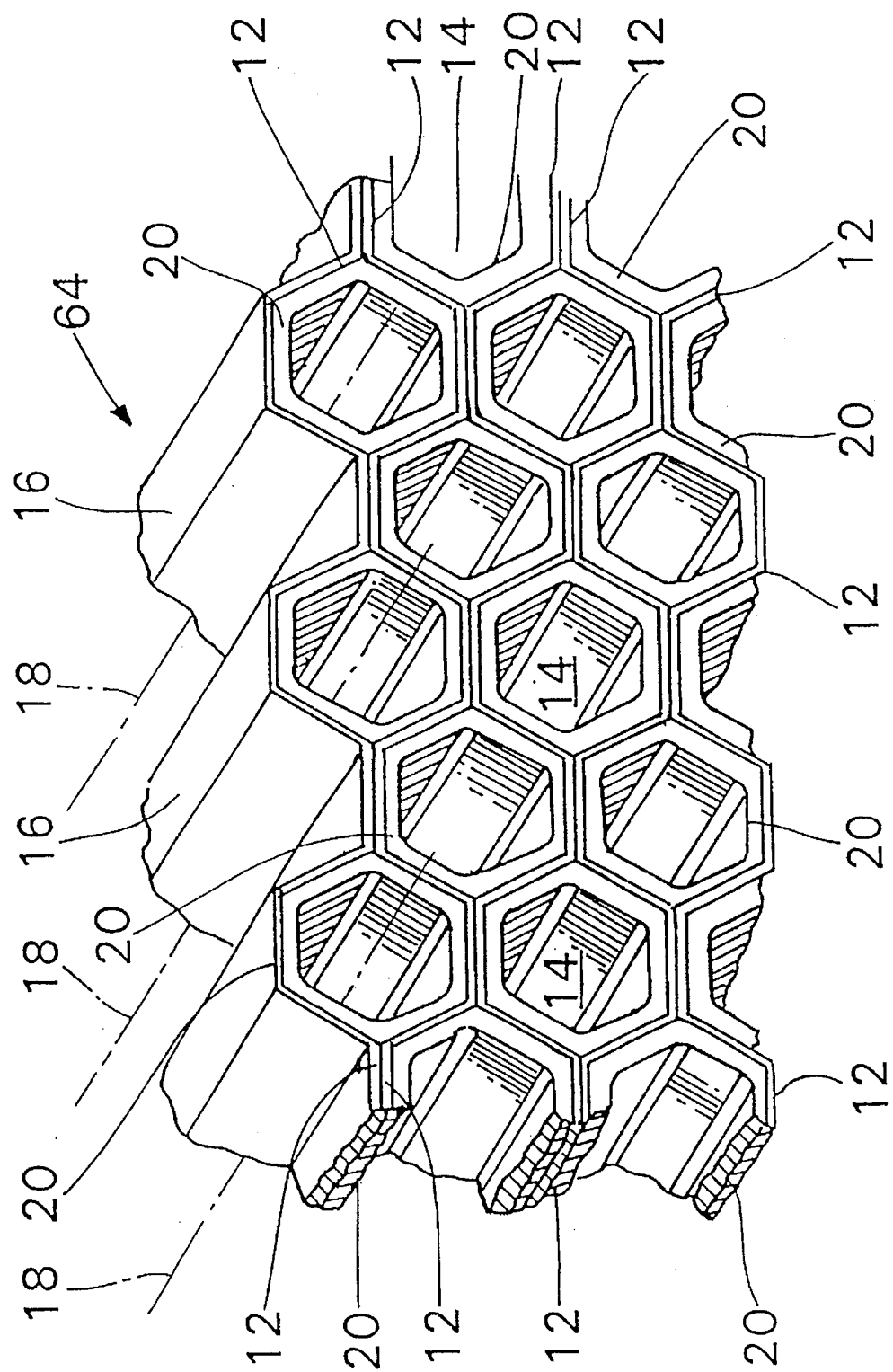
FIG. 3 is a greatly enlarged partial perspective view, partially in cross-section, of a core of a moisture transfer wheel used in the air-conditioning system shown in FIG. 2.
Figure 4:
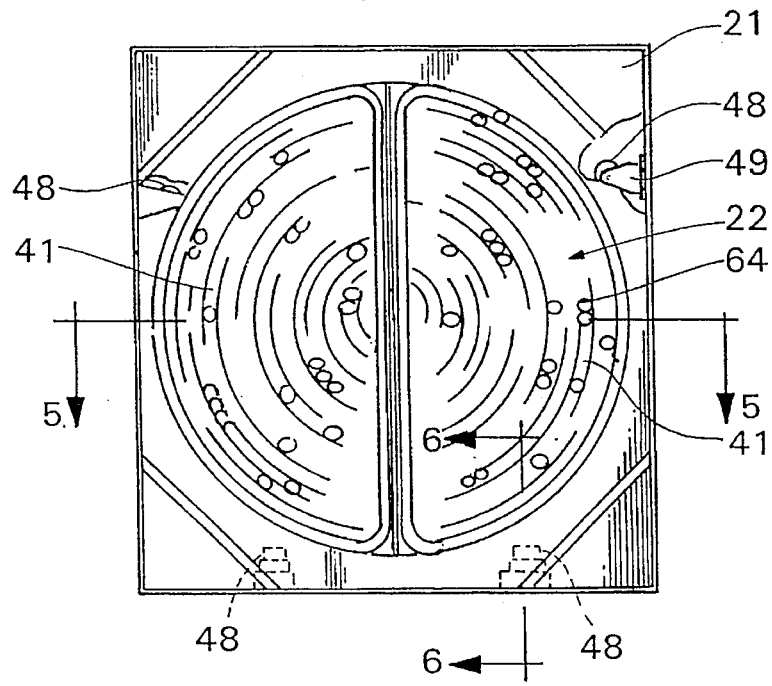
FIG. 4 is an enlarged front-elevational view of the moisture transfer wheel rotatably supported within a housing.

Referring now to FIGS. 3–6 and turning now to the construction of the moisture transfer wheel 22, the moisture transfer wheel 22 is rotatably mounted within a housing 21, as illustrated in FIG. 4. The moisture transfer wheel 22 comprises a core 64 and a rim 30. The core 64 is comprised of a plurality of adjoining parallel channels 14, as illustrated in FIG. 3. According to a preferred embodiment of the core 64, each of the channels 14 is generally in the form of a hexagon in cross section and includes an internal surface area 16. It is also preferred that the channels 14 be formed from a plurality of stacked layers of material 12. The layers of material 12 of the channels 14 have a minimum thickness to inhibit the effect of the wall thickness increasing the pressure drop through the core 64 and yet provide the core 64 with sufficient structural integrity to be self supporting. In the first preferred embodiment, it is preferred that the layers of material have a thickness of about 0.0015 inches. It is understood by those skilled in the art from this disclosure that the exact thickness of the walls formed by the layers of material 12 could vary, depending upon the particular application of the core 64 and existing manufacturing techniques, without departing from the spirit and scope of the invention. For instance, the thickness of the walls formed by the layers of material 12 could be in the range of about 0.001 to 0.006 inches.

Each of the channels 14 includes a centrally disposed longitudinal axis 18. The channels 14 are preferably sized such that a distance between and along longitudinal axes of adjacent channels is generally uniform (i.e., the adjacent channels 14 are equidistantly spaced from each other and extend generally parallel with respect to each other). In the first preferred embodiment, it is preferred that the distance between the longitudinal axes 18 be in the range of about 0.050 to 0.125 inches. Thus, the channels 14 of the present invention, due to their hexagonal cross-sectional configuration, are closely adjoined to increase the available transfer surface per unit of volume.

In the present embodiment, it is preferred that the layers of material 12 be comprised of a non-metallic, high-strength, temperature-resistant, low thermal conductivity material, such as Nomex® aramid in paper form. The process of assembling the layers of material 12 in the form of the channels 14 is well understood by those skilled in the art. An example of a commercially available product which meets the criteria of the present invention is Aeroweb® HMX-20 without the resilient resin coating, manufactured by Ciba Composites of Anaheim, Calif., a division of Ciba Geigy Corporation of Ardsley, N.Y. However, it is understood by those skilled in the art from this disclosure that the layers of material 12 and the manner in which they are formed are not pertinent to the present invention, and that other materials, such as kraft paper, nylon fiber paper, mineral fiber paper and the like could be used to construct the layers of material 12 and that other methods could be used to form the hexagonal channels 14, such as extrusion, machining or molding, without departing from the spirit and scope of the invention.

In the first preferred embodiment, the internal surface area 16 is coated with a desiccant material 20 which interacts with the fluid media flowing through the channels 14 to achieve water absorption from the air. In the first preferred embodiment, it is preferred that the core 64 be used in connection with both the moisture transfer wheel 22 and the heat exchange wheel 24 and that the desiccant 20 be an exchange or sorbent material which exchanges or sorbs one of heat and mass with the fluid media flowing through the channels 14. That is, it is preferred that the exchange or sorbent material be capable of removing mass or transferring heat from the fluid media flowing through the channels 14 and be capable of transferring mass or heat to the fluid media flowing through the channels 14. As used herein, the terms sorb and sorptive mean adsorption and/or absorption.

In the first preferred embodiment, it is preferred that the exchange or sorbent material be a desiccant material, such as a crystalline titanium silicate molecular sieve zeolite compound manufactured by Engelhard Corporation of Edison, N.J. under the trade name ETS and disclosed in U.S. Pat. No. 4,853,202, which is hereby incorporated by reference.

The use of channels having a cross section which is generally in the form of a hexagon is advantageous over other geometries, such as sinusoidal, square, and triangular. The following is a brief explanation of why a hexagon is better than other geometries. For a more detailed explanation, see U.S. patent application Ser. No. 08/246,548, filed May 20, 1994, which is hereby incorporated by reference in its entirety. First, the theoretical available transfer surface area (i.e., based upon standard measurements and calculations of the geometries prior to coating the interactive material) of a hexagon is greater than the transfer surface area of a sinusoidal, triangle or square for a given volume.

Second, the practical available transfer surface area (i.e., based upon standard measurements and calculations of the geometries after coating of the interactive material) of a hexagon is relatively greater, as compared to theoretical calculations, than the transfer surface area of a sinusoidal, triangle or square for a given volume because there are less surface area losses due to corner buildup. It is generally known that sorbent mass transfer is analogous to heat transfer. This relationship is defined in U.S. Pat. No. 5,148,374, which is hereby incorporated by reference, as the number of transfer units which corresponds to the effectiveness of the heat transfer. The greater the number of transfer units, the more effective the heat transfer. The number of transfer units is dependent on, among other things, the available transfer surface area. By minimizing corner build up, the core 64 of the present invention achieves a number of transfer units which is equal to or greater than the number of transfer units the prior art cores achieve.

Third, the pressure drop through the core 64 of the present invention is significantly less than the core constructed of the geometries mentioned above because there is virtually no buildup in the corners of the generally hexagon shaped channels 14. Hence, the power necessary to force the fluid media through the core 64 is significantly less than that needed to force the fluid media through the prior art cores. For instance, in the case of gas heated hybrid desiccant air-conditioning systems, the reduction in power requirements allows the desiccant systems to operate at the same cost as conventional CFC air-conditioning systems for the same output of BTU's, without the inherent risk to the environment presented by CFC air-conditioning systems.

Fourth, the hexagonal core 64 provides much better bonding between channels or cells compared to the wound corrugated process described in the aforementioned patent application. Thus, the possibility for leakage of either fluid from one stream to the other at the sealing points is greatly reduced.

While in the present invention it is preferred that the channels 14 be configured to be generally in the form of a hexagon in cross section, it is understood by those skilled in the art form this disclosure that the cross section of the channels could be other straight-sided shapes with equal angles and equal side lengths, such that the cross section approaches a circle, and which permit the channels to be closely adjoined to maximize the greatest transfer surface area per unit volume without departing from the spirit and scope of the invention. Although it is also understood by those skilled in the art from this disclosure that other geometries could be used, such as, triangle, square, sinusoidal, so long as the operating parameters described below are attained, without departing from the scope and spirit of the invention.

The preferred method of making the core 64 comprises forming the plurality of adjoining channels 14 such that the channels 14 are generally in the form of a hexagon in cross section. As is described above, each of the channels 14 has a centrally disposed longitudinal axis 18. The internal surface area 16 of the channels 14 is then coated with a suspension of the zeolite in water. After coating, the substrate/coating is dried to remove the water and provide zeolite adhered to the substrate. The coating of the internal surface area 16 of the channels 14 with the zeolite 20 is accomplished by forced flow passing of the zeolite 20, as suspended in water with silicate, through the channels 14 at a laminar flow rate. The coating of surfaces using forced-flow passing is well understood by those of ordinary skill in the art and, therefore, further description thereof is omitted for purposes of convenience only. However, it is also understood by those skilled in the art from this disclosure that the suspension of zeolite 20 could be applied to the internal surface area 16 of the channels 14 in other manners. For instance, the zeolite 20 could be applied, in a suspension form, to the internal surface area 16 by deposition, wherein the suspension is passed through the core 64 using a non-flooding technique. Alternatively, the zeolite 20 could be applied to the layers of material 12 prior to assembling the layers of material 12 into the generally hexagonal channels 14 or the zeolite 20 could be incorporated in the material which makes up the layers of material 12. Although it is preferred for reasons of safety and economy to use water as the suspension medium, organic solvents or mixtures of organic solvent(s) with water may also be employed.

Figure 5:
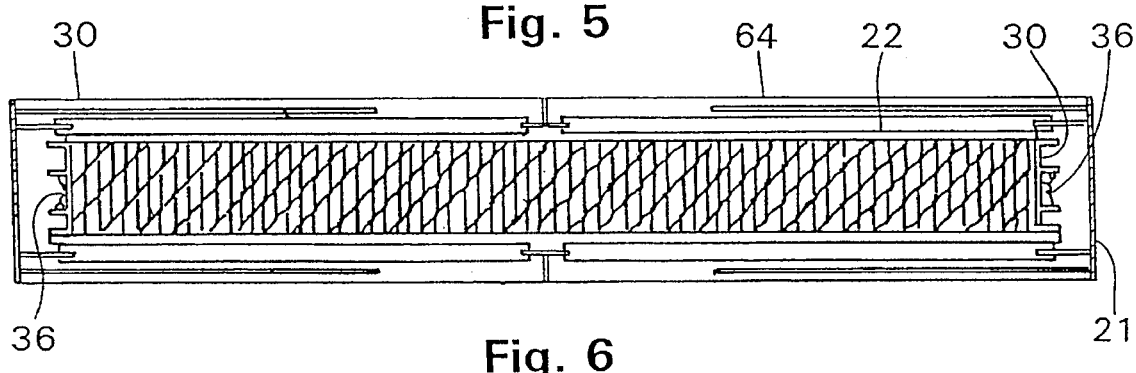
FIG. 5 is an enlarged cross-sectional view of the moisture transfer wheel shown in FIG. 4 taken along lines 5—5 of FIG. 4.
Figure 6:
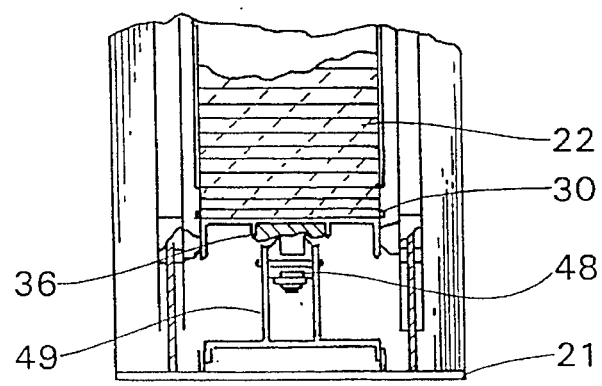
FIG. 6 is a greatly enlarged cross-sectional view of the moisture transfer wheel and housing shown in FIG. 4 taken along lines 6—6 of FIG. 4.

Referring now to FIGS. 4 through 6, there is shown the moisture transfer wheel 22 having the core 64 disposed therein. The layers of material 12 which form the channels 14 of the core 64 provide the core 64 with sufficient structural integrity for most size wheels to avoid the requirement of a hub assembly and spokes, and thus in a preferred embodiment, as shown in FIG. 4, there is no hub assembly or spokes.

The rim 30 has a radially outwardly extending track 36 on its external surface. The track 36 allows the moisture transfer wheel 22 to be supported at its periphery, and then rotatably mounted within the housing 21, as shown in FIG. 4. The housing 21 is generally in the form of a parallelepiped and includes a pair of semi-circular openings 41 on each side to allow the moisture transfer wheel 22 to be placed in the system 10 in alignment with the process and regenerative sides. A plurality of support wheels 48 are disposed within the housing 21 and are in rolling engagement with the track 36. The support wheels 48 are positioned to rotatably support the moisture transfer wheel 22 in the housing 21 such that the core 64 of the moisture transfer wheel 22 is in alignment or registry with the semicircular openings 41. As shown in FIG. 6, the support wheels 48 are supported within the housing 21 by a generally T-shaped support member 49 which permits the support wheel 48 to rotate with respect to the support member 49 in a manner well understood by those of ordinary skill in the art. The particular manner in which the support wheels 48 are supported within the housing 21 is not pertinent to the present invention. A drive mechanism (not shown) is disposed within the housing 21 and drivingly engages the exterior of the rim 30 to rotate the moisture transfer wheel 22 with respect to the housing 21.

The components of the housing 21 are preferably constructed of a high-strength, lightweight material, such as aluminum. However, it is understood by those skilled in the art from this disclosure that the housing 21 could be constructed of other materials, such as a polymeric material or stainless steel, without departing from the spirit and scope of the invention.

The details of the mounting and driving of the moisture transfer wheel 22 within the housing 21 are not pertinent to the present invention. It is recognized by those of ordinary skill in the art from this disclosure that the moisture transfer wheel 22 can be mounted in any manner without departing from the spirit and scope of the invention. Accordingly, further description thereof is omitted for purposes of convenience only, and is not limiting.

Figure 7:
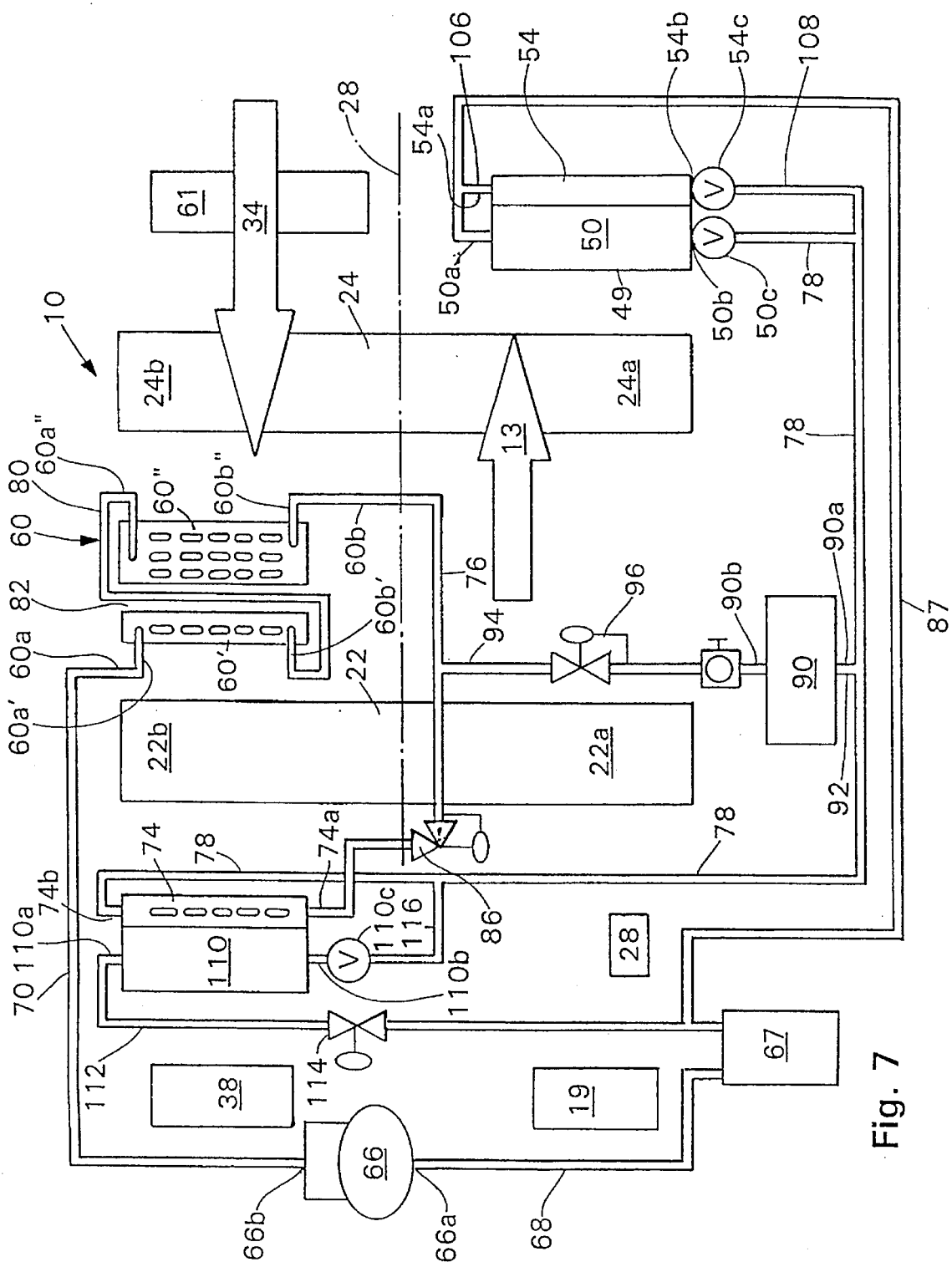
FIG. 7 is a schematic view of the system shown in FIG. 1.

Referring now to FIGS. 1 and 7, the system 10 includes first means for passing the process air 14 along a first path represented by broken line 15, preferably in series from an exit 11a from the building-enclosed space 11, through a first zone 22a of the rotatable desiccant wheel 22, through a first zone 24a of the rotatable heat-exchange wheel 24, and through an entrance 11b back into enclosed and conditioned space 11.

In this first preferred embodiment, the first means for passing the process air 13 from the enclosed space 11 through the system 10 along the first path 15 is a first fan 19. Fan 19 preferably draws air from the enclosed and conditioned space 11 and passes it through the system 10 as just described. In the preferred embodiment, the system 10 recirculates air from within the enclosed and conditioned space 11 to the extent feasible or desirable. However, it should be understood that it is generally necessary to supplement the process air 13 from the enclosed and conditioned space 11 with air from the surrounding ambient space for a variety of reasons, such as doors being opened, pressure differences, air infiltration, loss, etc.

In the first preferred embodiment, the fan 19 is preferably positioned upstream from the first wheel 22, directly adjacent thereto. However, it should be understood by those skilled in the art that the fan 19 could be positioned further upstream from the first wheel 22 or anywhere along the first path between exit 11a and entrance 11b at a significant distance therefrom, using conventional ducts (not shown). While it is preferred that the first means for passing process air from the enclosed space through the system 10 be comprised of a fan 19, it is understood by those of ordinary skill in the art from this disclosure that other devices could be used to pass air through the system 10, including but not limited to negative or positive pressure zones.

The system 10 further includes second means for passing regenerative air, generally designated by the arrow 34, from an ambient space, generally indicated as 32, outside the system 10, through an entrance 32a, along a second air path, indicated by broken line 35, through a second zone 24b of the heat-exchange wheel 24, through a second zone 22b of the desiccant wheel 22 and then through an exit 32b back to the ambient space 32 outside the enclosed space 11. The second means for passing the regenerative air 34 from the ambient space 34 through the system 10 back to the ambient space 34 preferably is comprised of a second fan 38, generally identical to the fan 19 described above. Preferably, the second fan 38 is located downstream from the second zone 22b of the desiccant wheel 22 either adjacent thereto or a distance therefrom, but in fluid communication therewith, using ducts (not shown), if necessary.

Referring now to FIGS. 1 and 2, the desiccant wheel 22 is suitably housed in a conventional fashion to define two sections to provide a first zone 22a (along the process air path 15) and a second zone 22b along the regenerative air path 35 through the desiccant wheel 22. The heat exchange wheel 24 is also suitably housed so as to be partitioned to provide first and second zones 24a, 24b along the first and second air paths 15 and 35, respectively, and is located substantially adjacent to the desiccant wheel 22. Each of the desiccant wheel 22 and heat exchange wheel 24 preferably is rotatably supported within a housing 21 and 25, respectively. Two partitions, represented by the lines 21a and 25a, coincide with the partitioning of the desiccant and heat exchange wheels 22, 24 to divide the system 10 into a closed path hereinafter referred to as "process side", having the first zones 22a, 24a of the moisture and heat exchange wheels 22, 24 and an open path hereinafter referred to as the "regenerative side" having the second zones 22b, 24b of the desiccant and heat exchange wheels 22, 24, respectively.

The system 10 further comprises a humidistat 40 located in at least one of the enclosed space 11 and the first path 15. The humidistat 40 detects the humidity of the process air 13 from the enclosed space 11. Humidistats are generally well known to those of ordinary skill in the art, and accordingly, further description is not believed necessary or limiting.

Referring now to FIGS. 1, 2 and 7, the system 10 includes a compressor 66 controlled by the humidistat 40, as described in more detail below. A first process evaporator 50 is coupled with the compressor 66 and located along the first path 15 between the rotatable heat exchange wheel 24 and the entrance 11b to the enclosed space 11. Preferably, a second process evaporator 54 is located between the rotatable heat exchange wheel 24 and the entrance 11*b* to the enclosed space 11 proximate to the first process evaporator 50. In the preferred embodiment, the first and second process evaporators 50, 54 are of different capacity with respect to one another and located in series between the heat exchange wheel 24 and the enclosed space 11. However, it is understood by those of ordinary skill in the art from the present disclosure that the first and second process evaporators 50, 54 could be located in parallel between the heat exchange wheel 24 and the enclosed space 11. Preferably, the first process evaporator 50 has about twice the capacity of the second process evaporator 54, such that second process evaporator coil 54 provides approximately ⅓ and the first process evaporator 50 provides approximately ⅔ of the total process evaporator capacity. The evaporators 50, 54 are constructed in a manner generally known to those of ordinary skill in the art, and accordingly, further description is not believed to be necessary or limiting. However, it is understood by those of ordinary skill in the art from the present disclosure that the relative capacities and the number of process evaporators can be varied depending on the particular application.

The first condenser 60 is fluidly coupled with the compressor 66 and located along the second path 35 between the rotatable wheels 22 and 24. Preferably, a second condenser 74 is fluidly coupled to the first condenser 60 and is located in series along the second path 35 between the rotatable desiccant wheel 22 and the exit 32*b* to ambient air 32.

A recovery evaporator 110 is fluidly coupled with the compressor 66 and located in series along the second path 35 between the second condenser coil 74 and the exit 32*b* to ambient air 32. Preferably, the recovery evaporator 110 has a predetermined capacity which is approximately equal in capacity to at least one of the first and second process evaporators 50, 54.

The system 10 further includes a thermostat 42 located in at least one of the first path 15 and the enclosed space 11. The compressor 66 is further controlled at least in part by the thermostat 42, as described in more detail below. Thermostats are generally well known to those of ordinary skill in the art, and accordingly, further description is not believed necessary or limiting.

Referring now to FIG. 7, the connections between the compressor 66, the process and recovery evaporators 50, 54, 110, and the first and second condensers 60, 74 are shown in detail. The compressor 66 has a suction side 66*a* in fluid communication with a first side 50*a* of the process evaporator 50 and a discharge side 66*b* in fluid communication with a first side 60*a* of the first condenser 60. More particularly, the suction side 66*a* of the first compressor 66 is in fluid communication with the first side 50*a* of the first process evaporator 50 via a first conduit 68 which is connected to a suction accumulator 67. The suction accumulator 67 is in fluid communication with the first process evaporator 50 via a sixth conduit 87. The discharge side 66*b* of the first compressor 66 is in fluid communication with the first side 60*a* of the first condenser coil 60 via a second conduit 70. A second side 50*b* of the first process evaporator 50 is in fluid communication with a second side 60*b* of the first condenser coil 60 as described in more detail below.

In the preferred embodiment, the second condenser coil 74 is positioned between the second zone 22*b* of the desiccant wheel 22 and the ambient space 32 such that the regenerative air 34 passes through the second condenser coil 74. The second condenser coil 74 includes a first side 74*a* in fluid communication with the second side 60*b* of the first condenser coil 60 via the third conduit 76. A hold-back valve 86 is located in the third conduit 76 between the first condenser coil 60 and the second condenser coil 74. The second condenser coil 74 includes a second side 74*b* in fluid communication with the second side 50*b* of the first process evaporator coil 50 via a fourth conduit 78, in a manner well understood by those skilled in the art.

The first condenser coil 60 is divided into first and second coil sections 60' and 60". The first coil section 60' has a first side 60*a*' in fluid communication with the discharge side 66*b* of the first compressor 66 via the second conduit 70. The first coil section 60' of the first condenser coil 60 includes a second side 60*b*' in fluid communication with a first side 60*a*" of the second coil section 60" via a fifth conduit 80. The second coil section 60" has a second side 60*b*" in fluid communication with the second side 50*b* of the process evaporator 50 through the third conduit 76, second condenser coil 74 and fourth conduit 78.

In the first preferred embodiment, the first coil section 60' is spaced from the second coil section 60" by an air gap 82 to minimize heat transfer between the first and second coil sections 60', 60". More particularly, the first coil section 60' is comprised of a single row coil wherein the tubes of the coil are thermally connected together by a plurality of thin, thermally conductive fin sheets, in a manner well understood by those skilled in the art. Similarly, the second coil section 60" is comprised of a coil having three rows of tubes thermally connected together by a plurality of thin, thermally conductive fin sheets, also in a manner well understood by those skilled in the art. The air gap 82 exists between the fin sheets of the first and second coil sections 60', 60".

By separating the first condenser coil 60 into the first and second coil sections 60', 60", heat transfer between the first and second coil sections 60', 60" is minimized. That is, the separation of the first and second coil sections 60', 60" eliminates heat transfer from the first coil section 60' to the second coil section 60" through the fin sheets, thereby minimizing the averaging effect described above, and allowing the first coil section 60' to be as hot as possible and the air flowing from the first condensing coil 60 to be as hot as possible.

As can be seen from FIG. 7, since the first coil section 60' only has a single row of tubes and the second coil section 60" has three rows of tubes, the surface transfer area of the first coil section 60' is less than the surface transfer area of the second coil section 60". The first coil section 60' is positioned between the second zone 22*b* of the desiccant wheel 22 and the second coil section 60" so that the regenerative air 34 flowing across the first coil section 60' is heated by the super heated refrigerant fluid flowing directly from the discharge side 66*b* of the first compressor 60 through the second conduit 70. It is preferred that the first coil section 60' be positioned downstream from the second coil section 60" and that the first coil section 60' be in direct fluid communication with the first compressor 66, because it allows the regenerative air 34 flowing across the first condensing coil 60 to see the first coil section 60' last. Since the first coil section 60' is hotter than the second coil section 60" (because the air gap 82 prevents the averaging effect described above), the regenerative air 34 flowing into the desiccant wheel 22 can be at higher temperature than with the use of conventional condensing coils, without increasing the temperature of the refrigerant fluid flowing through the coil 60.

While in the first preferred embodiment, it is preferred that the first coil section 60' and the second coil section 60"

be comprised of one and three rows of tubes, respectively, it is understood by those of ordinary skill in the art from this disclosure that the present invention is not limited to any particular number of rows of tubes in either the first or second coil sections 60', 60" and that the first condenser coil 60 can be divided into more than two sections. With respect to the spacing or air gap between the first and second coil sections 60', 60", the spacing is sized to minimize the transfer of heat between the first and second coil sections 60', 60" (i.e., to prevent the relatively lower temperature of the second coil section 60" from lowering the relatively higher temperature of the first coil section 60'), and yet allows the first condensing coil 60 to be positioned between the second zones 22b, 24b of the moisture transfer wheel 22 and heat exchange wheel 24.

The system 10 also includes a receiver 90 in fluid communication with the second side 60b of the first condenser coil 60 and the second side 50b of the first process evaporator coil 50. More particularly, a seventh conduit 92 extends between the outlet side 90a of the receiver 90 and the fourth conduit 78 which is in fluid communication with the first process evaporator coil 50. An eighth conduit 94 extends between the inlet side 90b of the receiver 90 and the third conduit 76, which is in fluid communication with the second side 60b of the first condenser coil 60. The eighth conduit 94 includes a pressure regulator valve 96 which senses the pressure of the refrigerant fluid within the receiver 90. When the pressure of the refrigerant fluid within the receiver 90 falls below a predetermine value, the pressure regulator valve 96 opens to allow refrigerant fluid within the first condenser coil 60 to flow into the receiver 90. It is preferred that the receiver 90 be in fluid communication with the second side 60b of the first condensing coil 60, as opposed to the second conduit 70 which would result in diverting needed hot refrigerant fluid away from the first condensing coil 60.

The receiver 90 is also in fluid communication with the second side 74b of the second condenser coil 74 so that the first process evaporator 50 can receive refrigerant fluid from the receiver 90 when the hold-back valve 86 is closed as described in more detail hereinafter. More particularly, the first side 90a of the receiver 90 is in fluid communication with the second side 74b of the second condenser coil 74 via the seventh conduit 92 which is connected to the fourth conduit 78.

The second process evaporator 54 includes a first side 54a which is in fluid communication with the suction side 66a of the first compressor via an eleventh conduit 106 which is in fluid communication with the sixth conduit 87, which is connected to the suction accumulator 67, which is in turn connected to the first conduit 68. The second process evaporator 54 includes a second side 54b in fluid communication with the second side 74b of the second condenser coil 74 via a twelfth conduit 108 which is in fluid communication with the fourth conduit 78.

As mentioned above, the system 10 includes a hold-back valve 86. The hold-back valve 86 is positioned between the second side 60b of the first condenser coil 60 and the second condenser coil 74. The hold-back valve 86 is responsive to a pressure of the refrigerant fluid within the first condenser 60 such that the hold-back valve 86 is open when the pressure of the refrigerant fluid within the portion of the first condenser coil 60 is above a predetermined pressure and the hold-back valve 86 is closed when the pressure of the refrigerant fluid within the first condenser coil 60 is below the predetermined pressure.

The recovery evaporator 110 is positioned downstream of the second condenser coil 74, and includes a first side 110a in fluid communication with the suction side 66a of the first compressor 66 and a second side 110b in fluid communication with the second side 60b of the first condenser coil 60. More particularly, a thirteenth conduit 112 extends between the first side 110a of the recovery evaporator 110 and the sixth conduit 87 which is in fluid communication with the suction accumulator 67, which is in fluid communication with the suction side 66a of the compressor 66 through the first conduit 68. The thirteenth conduit 112 includes a crank case pressure regulator 114 for sensing the pressure of the refrigerant fluid within the suction accumulator 67. A fourteenth conduit 116 extends from the second side 110b of the recovery evaporator 110 and is in fluid communication with the fourth conduit 78 which is in fluid communication with the second side 74b of the second condensing coil 74 and the outlet 90a of the receiver 90 via the seventh conduit 92. As such, the recovery evaporator 110, the first process evaporator coil 50 and the second process evaporator coil 54 are arranged in parallel between the first condenser coil 60 and the first compressor 66.

The second side 50b, 54b, 110b of each of the first process evaporator coil 50, the second process evaporator coil 54 and the recovery evaporator 110, respectively, are in fluid communication with an expansion valve, which effects a pressure drop of the refrigerant flowing into the respective coil, and either a solenoid valve or a controllable proportioning valve, commonly designated 50c, 54c and 110c, respectively. The solenoid valves 50c, 54c and 110c are actuated between open and closed positions to control the refrigerant flow through the respective evaporator coils 50, 54 and 110.

If more precise control is desired, controllable proportioning valves 50c are 54c are utilized. Preferably, the controllable proportioning valves are electronically controlled to controllably vary the rate of refrigerant flow through at least one of the first and second process evaporators 50, 54, and preferably controllably vary the refrigerant flow rate through the recovery evaporator 110. Preferably, a second thermostat 44 is located in one of the first path 15 and the enclosed space 11, downstream from the first process evaporator 50, and preferably downstream from both the first and second process evaporators 50, 54. The controllable proportioning valve(s) 50c and/or 54c are controlled by the second thermostat 42 based on the temperature of the process air 13 exiting the system 10. Electronically controllable proportioning valves are known to those of ordinary skill in the art, and accordingly, further description is not believed to be necessary or limiting. Additionally, it is similarly understood by those of ordinary skill in the art that other types of controllable valves, such as pneumatically or mechanically controlled valves could be used, if desired.

In the alternative embodiment of the system 10, a controllable proportioning valve 110c is coupled with the recovery evaporator 110 so as to control a rate of refrigerant flow through the recovery evaporator 110. Preferably, the controllable proportioning valve 110c is controlled by a pressure sensor (not shown) which senses the compressor operating suction pressure.

The present invention also provides an improvement to desiccant assisted space conditioning systems which include rotatable desiccant and heat exchange wheels 22, 24, separate process and regenerative air paths 15, 35 through each of the rotatable wheels 22, 24, a condenser 60 along the regenerative air path 35 between the two wheels 22, 24, a recovery evaporator 110 along the regenerative air path 35 on a side of the desiccant wheel 22 facing away from the condenser 60, such as the systems described in U.S. application Ser. No. 08/409,296, filed on Mar. 23, 1995, which is incorporated herein by reference as if fully set forth.

The improvement is provided by a first process evaporator 50 along the process air path 15 on a side of the heat exchange wheel 24 facing away from the condenser 60. Means for modulating a non-zero rate of refrigerant flow through at least one of the condenser 60, the recovery evaporator 110 and the first process evaporator 50 are provided through the use of the hold-back valve 86, and the controllable proportioning valves 50c, 54c and 110c as described above which are controlled by a humidistat 40, and optionally a thermostat 42 and a pressure sensor (not shown) for monitoring the compressor operating suction pressure for controllably varying the cooling of dehumidified air exiting the process air path 15.

The system 10 has several modes of operation: a fast-condensing start-up mode and three operating modes-dehumidification, dehumidification and first stage cooling, and dehumidification and second stage cooling. Generally, in all modes the system 10 is operated by activating the desiccant assisted dehumidification and cooling system 10 when the level of moisture of air in the enclosed space 11 is above a desired level, by rotating the desiccant wheel 22 and heat exchange wheel 24 in a manner well understood by those of ordinary skill in the art. Process air 13 is drawn from the enclosed space 11 into the system 10 along the first air path 15. The process air 13 is passed through the first zone 22a of the moisture transfer wheel 22 to reduce the moisture level of the air 13 passing therethrough. The process air 13 leaving the first zone 22a of the moisture transfer wheel 22 then passes through the first zone 24a of the heat transfer wheel 24 to lower the dry bulb temperature of the process air 13 passing therethrough. The process air 13 leaving the first zone 24a of the heat transfer wheel 24 then passes through the first and second process evaporators 50, 54 to further lower the dry bulb temperature of the process air 13 passing therethrough. Regenerative air 34 is drawn from the ambient space 32 through the entrance 32a along the second path 35. The regeneration air 34 passes through a second zone 24b of the heat exchange wheel 24 to raise the dry bulb temperature of the regeneration air 34 passing therethrough and regenerate the heat exchange wheel 24. The regeneration air 34 leaving the second zone 24b of the heat exchange wheel 24 is then heated, preferably by the first condenser 60, to further raise the dry bulb temperature of the regeneration air 34 leaving the second zone 24b of the heat exchange wheel. The heated regeneration air 34 is then passed through a second zone 22b of the moisture transfer wheel 22 to lower the dry bulb temperature and regenerate the moisture transfer wheel 22. The regeneration air 34 leaving the second zone 22b of the moisture wheel 22 passes through the recovery evaporator 110.

While the desiccant and heat exchange wheels 22, 24 are rotating, the compressor 66 is operated to compress the refrigerant to a vapor phase at a first temperature and pressure. The vapor phase refrigerant is condensed with the flow of regeneration air 34 by passing the refrigerant through the first condenser coil 60 to create a saturated liquid phase refrigerant. The saturated liquid phase refrigerant is then passed through a flow restriction, such as the expansion valves 50c, 54c, 110c, to create a mixed liquid and vapor phase refrigerant at a lower temperature and pressure than the first temperature and pressure. The mixed liquid and vapor phase refrigerant is heated in at least two of the first and second process evaporators 50, 54 and the recovery evaporator 110 with at least one of the process air 14 and the regenerative air 34 to create a vapor phase refrigerant which has a lower temperature and pressure than the first temperature and pressure of the compressed refrigerant. The refrigerant is then passed to the suction accumulator 67 from which the first compressor 66 draws vaporized refrigerant.

More particularly, as the refrigerant fluid passes from the compressor 66, it is partially condensed in the first condenser coil 60, with a majority of the condensing occurring in the first coil section 60'. The refrigerant fluid then flows from the first condenser coil 60 to the second condenser coil 74. As the refrigerant fluid exits the second condenser coil 74, it is fully condensed.

The hold-back valve 86 senses the pressure of the refrigerant fluid as it exits the second coil section 60" of the first condensing coil 60. At start-up, there is less heat transferred from the process side by the heat transfer wheel 24 because the desiccant wheel 22 is not removing as much moisture. The process air leaves the desiccant wheel 22 cooler and in turn leaves the heat transfer wheel 24 cooler, which means less of a load for the first and second process evaporator coils 50, 54. This means that the thermal wheel 24 is cooler at start-up, and the regeneration air 34 does not remove as much heat from the second zone 24b of the heat transfer wheel 24. The regeneration air 34 therefore enters the first condenser 60 at a lower temperature and requires a greater temperature increase. Less heat of rejection is available from the compressor 66 because it is picking up less heat from the process evaporator coils 50, 54.

In the fast-condensing start-up mode, the hold-back valve 86 is activated due to the lower condenser pressure to restrict the flow of refrigerant fluid from the first condensing coil 60. The refrigerant fluid is drawn through the receiver 90, which is piped as a surge receiver, which allows any sub-cooled liquid leaving the first condenser 60 to go to the expansion valves without being destroyed in the receiver 90. With the compressor 66 working at maximum suction pressure, the hold-back valve 86 holds back the condensed liquid refrigerant to flood the condenser 60 and raise the operating pressure. The receiver pressure regulator 96 controls the receiver pressure and pushes liquid out to the recovery evaporator 110 through the fourth and fourteenth conduits 78, 116. The valves 50c and 54c for the recovery evaporators 50, 54 are closed and the valve 110 for the recovery evaporator 110 is open. The refrigerant is heated in the recovery evaporator 110 to a vapor state and drawn to the suction accumulator 67 through the thirteenth conduit 112, before being drawn through the first conduit 68 back to the compressor 66. By passing the refrigerant through the recovery evaporator 110 to pick up extra heat from the regenerative air 34, the compressor 66 can increase the discharge pressure to the condenser 66.

Once the operating condenser pressure is reached in the first condenser coil 60, the hold-back valve 86 will begin to open and allow the refrigerant fluid to flow out and into the second, post-condenser 74. The refrigerant fluid from the post-condenser 74 flows through the fourth and twelfth conduits 78 and 108 to the first and second process evaporators 50, 54 and/or the recovery evaporator 110, depending on the mode of operation, as described below. At an adjustable point, set above the valve control point for the hold back valve 86, a pressure switch (not shown) is used to determine that less heat pickup is required and turns off the fast-condensing start-up mode. It is also possible to use a time delay relay set for a pre-determined time to shut off the fast-condensing start-up mode.

The hold-back valve 86 remains open when the condensing coil 60 is at operating pressure and the refrigerant fluid passes to the second condensing coil 74. Any flashing of refrigerant fluid that occurs as the refrigerant fluid flows through the hold-back valve 86 is condensed in the second condensing coil 74.

In the dehumidification mode, the solenoid valves 54c and 110c for the second process evaporator 54 and the recovery evaporator 110 are turned on, and the solenoid valve 50c for the first process evaporator 50 is off. The humidistat 40 senses the level of moisture in the air in the enclosed space and activates the system 10 when the moisture level is above a desired level. Preferably, the dry bulb temperature of the process air is sensed by the thermostat 42. The first fan 19 draws process air 13 from the enclosed space 11 into the system 10. Moisture is removed from the process air 13 by the desiccant wheel 22 in an exothermic process, raising the temperature of the process air 13. The process air 13 is then drawn through the heat exchange wheel 24, lowering the temperature of the process air 13. The process air 13 is then passed through the second process evaporator 54 to cool the air to its initial temperature, avoiding overcooling of the process air 13 and achieving dehumidification only. Preferably, the flow of refrigerant through the recovery evaporator 110 and the second process evaporator 54 is controlled such that the dry bulb temperature of the process air 13 reentering the enclosed space 11 is approximately the same as the dry bulb temperature of the process air 13 which was drawn from the space 11 and the level of moisture in the air 13 is at or below the desired level.

When the alternative electronically controllable proportioning valve 54c is utilized in place of the solenoid valve 54c, the flow of refrigerant to the second process evaporator 54 is modulated based on the temperature of the process air 13 as it exits the system 10 through the entrance 11b to the enclosed space. The leaving process air 13 temperature is measured with a thermostat 44 (shown in FIG. 2) to control the controllable expansion valve 54c. The excess refrigerant flow is forced through the recovery evaporator 110. Refrigerant flow through the recovery evaporator 110 may also be controlled with a electronically controllable expansion valve 110c which is modulated based on the compressor operating suction pressure, in a manner easily understood by those of ordinary skill in the art from the present disclosure.

If both dehumidification and cooling are required, the present system 10 provides two cooling stages to prevent overcooling and reduce the system 10 operating costs. In the dehumidification and first stage cooling mode, the solenoid valves 50c and 110c for the first process evaporator 50 and the recovery evaporator 110 are turned on, and the solenoid valve 54c for the second process evaporator 54 is off. The refrigerant flows from the second side 74b of the second condensing coil 74 to the first process evaporator 50 and the recovery evaporator 110 through the fourth conduit 78 and the fourteenth conduit 116. The refrigerant fluid then flows from the first process evaporator 50 and the recovery evaporator 110 in a relatively low temperature and pressure vapor form through the sixth conduit 87 and the thirteenth conduit 112 to the suction accumulator 67. The suction side 66a of the compressor 66 draws the refrigerant fluid from the suction accumulator 67 through the first conduit 68.

A thermostat 42 senses the dry bulb temperature of the process air 13 from the enclosed space and activates the system 10 when the temperature is above a desired level. The first fan 19 draws air process 13 from the enclosed space 11 into the system 10. Moisture is removed from the process air 13 by the desiccant wheel 22 in an exothermic process, raising the temperature of the process air 13. The process air 13 is then drawn through the heat exchange wheel 24, lowering the temperature of the process air 13. The process air is then passed through the first process evaporator 50 to cool the air to a desired temperature. The flow of refrigerant is controlled by the solenoid valves 50c, 54c and 110c to flow through the recovery evaporator 110 and the first process evaporator 50 such that the dry bulb temperature of the process air 13 which reenters the enclosed space 11 through the entrance 11b is lower than the dry bulb temperature of the process air 13 drawn from within the enclosed space.

Electronically controllable expansion valves 50c and 110c can be used for more accurate temperature control of the process air 13 by modulating the flow of refrigerant through the first process evaporator 50 and recovery evaporator 110.

In the dehumidification and second stage cooling mode, maximum cooling is provided. The solenoid valves 50c and 54c of the first and second process evaporator coils 50 and 54 are open, and the solenoid valve 110c of the recovery evaporator 110 is closed. The refrigerant flows from the second side 74b of the second condensing coil 74 to the first and second process evaporators 50 and 54 through the fourth conduit 78 and the twelfth conduit 108. The refrigerant fluid then flows from the first and second process evaporators 50, 54 in a relatively low temperature and pressure vapor form through the sixth conduit 87 to the suction accumulator 67. The suction side 66a of the compressor 66 draws the refrigerant fluid from the suction accumulator 67 through the first conduit 68.

A thermostat 42 senses the temperature of the air 13 from within the enclosed space 11 and activates the system 10 when the dry bulb temperature is above a desired level. The first fan 19 draws air process 13 from the enclosed space 11 into the system 10. Moisture is removed from the process air 13 as described above and the process air 13 is then drawn through the heat exchange wheel 24, lowering the temperature of the process air 13. The process air 13 is then passed through the first and second process evaporators 50 and 54 to cool the air to a desired temperature. The flow of refrigerant is controlled by the solenoid valves 50c, 54c and 110c to flow through the first process evaporator 50 and the second process evaporator 54 such that the dry bulb temperature of the process air 13 reentering the enclosed space 11 is lower than the dry bulb temperature of the process air 13 drawn from the enclosed space 11.

For more precise control, the dry bulb temperature of the process air being drawn from the enclosed space is sensed by the first thermostat 42, and the dry bulb temperature of the off the process air 13 is sensed by the second thermostat 44 after the process air 13 has passed through the first and second process evaporators 50, 54. The flow of refrigerant through the first and second process evaporators 50, 54 and the recovery evaporator 110 is modulated by solenoid valves or the controllable proportioning valves 50c, 54c, 110c such that the dry bulb temperature of the process air 13 reentering the enclosed space 11 is at a desired temperature.

From the foregoing description, it can be seen that the present invention comprises a hybrid dehumidification and cooling system. It will be appreciated by those skilled in the art from this disclosure that changes could be made to the embodiment and the methods of operation described above in the foregoing description without departing from the broad, inventive concepts thereof. Thus, the present invention is not limited to the particular embodiment disclosed, but is intended to cover all modifications which are within the scope and spirit of the invention as defined by the appended claims.

We claim:

1. A desiccant assisted system for dehumidification and cooling of an enclosed space from ambient air comprising:
   a rotatable desiccant wheel;
   a rotatable heat exchange wheel;
   a first path for process air extending from an exit of the enclosed space to be conditioned in series through a first zone of the rotatable desiccant wheel, a first zone of the rotatable heat exchange wheel and an entrance to the enclosed space;
   a second path separate from the first path for regenerative air and extending from an entrance to an ambient space outside the enclosed space in series through a second zone of the rotatable heat exchange wheel, through a second zone of the rotatable desiccant wheel and through an exit back to ambient space outside the enclosed space;
   a compressor;
   a first process evaporator coupled with the compressor and located along the first path between the rotatable heat exchange wheel and the entrance to the enclosed space;
   a second process evaporator located along the first path between the rotatable heat exchange wheel and the entrance to the enclosed space proximate the first process evaporator;
   a condenser coupled with the compressor and located along the second air path between the rotatable wheels; and
   a recovery evaporator coupled with the compressor and located in series along the second path between the rotatable desiccant wheel and the exit to ambient air.

2. The system of claim 1 further comprising a humidistat located in at least one of the enclosed space and the first path for controlling the compressor.

3. The system of claim 2 wherein the recovery evaporator has a predetermined capacity which is approximately equal in capacity to at least one of the first and second process evaporators.

4. The system of claim 2 wherein the first and second process evaporators are of different capacity with respect to one another.

5. The system of claim 4 wherein the first process evaporator has about twice the capacity of the second process evaporator.

6. The system of claim 1 comprising a thermostat located in at least one of the first path and the enclosed space wherein the compressor is further controlled at least in part by the thermostat.

7. The system of claim 1 further comprising a controllable proportioning valve coupled with at least one of the first and second process evaporators so as to controllably vary a rate of refrigerant flow through the at least one of the first and second process evaporators.

8. The system of claim 7 further comprising a thermostat located in one of the first path and the enclosed space, downstream from the first process evaporator, the controllable valve being controlled by the thermostat.

9. The system of claim 8 further comprising a controllable proportioning valve coupled with the recovery evaporator to control a rate of refrigerant flow through at least a portion of the recovery evaporator.

10. The system of claim 7 further comprising a controllable proportioning valve coupled with the recovery evaporator to control a rate of refrigerant flow through at least a portion of the recovery evaporator.

11. An improvement in a desiccant assisted space conditioning system including rotatable desiccant and heat exchange wheels, separate process and regenerative air paths through each of the rotatable wheels, a condenser along the regenerative air path between the two wheels, a recovery evaporator along the regenerative air path on a side of the desiccant wheel facing away from the condenser, the improvement comprising:
   a first process evaporator along the process air path on a side of the heat exchange wheel facing away from the condenser; and
   means for modulating a non-zero rate of refrigerant flow through at least one of the condenser, the recovery evaporator and the first process evaporator for controllably varying the cooling of dehumidified air exiting the process air path.

12. A method of operating a desiccant assisted dehumidification and cooling system comprising the steps of:
   (a) activating the desiccant assisted dehumidification and cooling system when the level of moisture of air in an enclosed space is above a desired level;
   (b) drawing process air from the enclosed space into the system;
   (c) passing process air through a first zone of a moisture transfer wheel to reduce the moisture level of the air passing therethrough;
   (d) passing the process air leaving the first zone of the moisture transfer wheel through a first zone of a heat transfer wheel to lower the dry bulb temperature of the process air passing therethrough;
   (e) passing the process air leaving the first zone of the heat exchange wheel through first and second process evaporators to further lower the dry bulb temperature of the process air passing therethrough;
   (f) passing regeneration air through a second zone of the heat exchange wheel to raise the dry bulb temperature of the regeneration air passing therethrough and regenerate the heat exchange wheel;
   (g) heating the regeneration air leaving the second zone of the heat exchange wheel to further raise the dry bulb temperature of the regeneration air leaving the second zone of the heat exchange wheel;
   (h) passing the heated regeneration air in step (f) through a second zone of the moisture transfer wheel to lower the dry bulb temperature and regenerate the moisture transfer wheel;
   (i) passing the air leaving the second zone of the moisture wheel through a recovery evaporator;
   (j) compressing a refrigerant to a vapor phase at a first temperature and pressure;
   (k) condensing the vapor phase refrigerant with the flow of regeneration air from step (g) to create a saturated liquid phase refrigerant;
   (l) passing the saturated liquid phase refrigerant through a flow restriction to create a mixed liquid and vapor phase refrigerant at a lower temperature and pressure than the first temperature and pressure; and
   (m) heating the mixed liquid and vapor phase refrigerant in at least two of the first and second process evaporators and the recovery evaporator with at least one of the process air from step (e) and the regenerative air from step (i) to create a vapor phase refrigerant to be used in step (j) which has a lower temperature and pressure than the first temperature and pressure of the compressed refrigerant of step (j).

13. The method of claim 12 further comprising the steps of:

(n) sensing a dry bulb temperature of the process air in step (b);

(o) controlling the flow of refrigerant in step (m) to flow through the recovery evaporator and the second process evaporator such that the dry bulb temperature of the process air in step (e) is approximately the same as the dry bulb temperature of the process air in step (b) and the level of moisture in the air is below the desired level.

14. The method of claim 12 further comprising the steps of:

(n) sensing a dry bulb temperature of the process air in step (b);

(p) controlling the flow of refrigerant in step (m) to flow through the recovery evaporator and the first process evaporator such that the dry bulb temperature of the process air in step (e) is lower than the dry bulb temperature of the process air in step (b) and the level of moisture in the air is below the desired level.

15. The method of claim 12 further comprising the steps of:

(n) sensing a dry bulb temperature of the process air in step (b);

(q) controlling the flow of refrigerant in step (m) to flow through the first process evaporator and the second process evaporator such that the dry bulb temperature of the process air in step (e) is lower than the dry bulb temperature of the process air in step (b) and the level of moisture in the air is below the desired level.

16. The method of claim 12 further comprising the steps of:

(n) sensing a dry bulb temperature of the process air in step (b);

(r) sensing the dry bulb temperature of the process air after the process air has passed through the first and second process evaporators in step (e);

(s) modulating the flow of refrigerant in step (m) through the first and second process evaporators and the recovery evaporator such that the dry bulb temperature of the process air in step (e) is at a desired temperature and the level of moisture in the air is below the desired level.

* * * * *